Patented Feb. 21, 1933

1,898,709

UNITED STATES PATENT OFFICE

ROBERT W. BELFIT, OF WATERTOWN, CONNECTICUT, ASSIGNOR TO SCOVILL MANUFACTURING COMPANY, OF WATERBURY, CONNECTICUT, A CORPORATION OF CONNECTICUT

ALDEHYDE AMINO RESINOUS COMPOUNDS AND PROCESSES

No Drawing. Application filed June 25, 1927. Serial No. 201,555.

The present invention relates particularly to compounds produced from condensation products obtainable from the ureas, such as urea (carbamid), thiourea (thiocarbamid) and/or their derivatives, and to a process of producing such compounds. The use of kindred compounds, as equivalents, broadly, of the ureas, for forming condensation products, is contemplated. For example, cyanamid ($NCNH_2$), guanidine ($HNC(NH_2)_2$) and/or active derivatives thereof may be employed in lieu of the ureas. These may all be classed as compounds having a group containing a carbon atom bonded to two or more nitrogen atoms, at least one of which is an amino-nitrogen.

Condensation products of the ureas are known, but hitherto they have been capable of little, or very limited, practical use. Likewise condensation products of the derivatives, such as benzoylcarbamid, acetylcarbamid, etc. are known.

In accordance with the present invention, it is possible to combine with condensation products of the ureas a suitable chemical-resistivity increasing agent, for example, salicylic acid taken in considerable proportion, and thereby obtain a resultant product which is vastly more resistant to the action of solvents, sulphur compounds and other corrosive agents. Also, by producing the improved compound in the form of a solution employing suitable solvents, it is possible to provide a novel lacquer having improved characteristics. Such a lacquer may be employed, for example, in protecting metal surfaces, and is particularly valuable in protecting the surfaces of non-ferrous metals, such as silver, nickel, copper, brass, aluminum, and various alloys.

In forming the novel compound embodied in a solution, suitable as a lacquer, for example, it is preferred to preparatorily form a soluble condensation product of a urea and formaldehyde, or its equivalent; and in this procedure, it is preferred to employ urea and formaldehyde (40% solution) in the proportions of one gram of urea to about 5 cc. of formaldehyde. Commercial formaldehyde commonly contains a very small percentage of formic acid, generally not exceeding about .2 of 1%. Formaldehyde containing such a small percentage of formic acid may be employed in effecting the condensation of urea, if desired; or, formaldehyde free from formic acid may be employed.

The soluble condensation product of urea, for example, may be produced by reacting upon urea with formaldehyde or an equivalent reagent, such as the polymers of formaldehyde.

Condensation products of the ureas and equivalent materials listed above and aliphatic aldehydes may be referred to appropriately as condensation products of the urea-formaldehyde type.

In accordance with the present invention, a chemical-resistivity increasing agent, such as salicylic acid, is employed; and this agent preferably is introduced into the urea condensation product after the condensation product has been preparatorily formed.

Where a lacquer is to be produced, the preferred procedure is to first produce the soluble urea condensation product in aqueous solution, and thereafter mix therewith a solution of the chemical-resistivity increasing agent, the latter solution employing an organic solvent, or preferably a plurality of organic solvents having low surface tensions and possessing different boiling points.

It is important, in producing a lacquer for application to metal surfaces, particularly, to employ a suitably balanced combination of solvents which will give to the lacquer a comparatively low surface tension, impart to it proper spreading qualities, and permit the progressive evolution of the solvents without injuring the film of lacquer applied to the surface to be protected.

The preferred combination of solvents for a lacquer made in accordance with the present invention comprises water and a plurality of organic solvents, preferably a low boiling solvent, such as ethyl alcohol (B. P. 78° C.), a medium boiling solvent, such as butyl alcohol (B. P. 118° C.), and a high boiling solvent, such as ethyl lactate (B. P. 154° C.), the latter being preferably used in relatively small proportion. The water, ethyl alcohol, and butyl alcohol, may be of approximately the same proportions, although preferably varying somewhat; and the ethyl lactate preferably is employed in considerably smaller proportion, largely for economical reasons.

As an example of the preferred process in which a urea condensation product is preparatorily formed and afterwards combined with a chemical-resistivity increasing agent, the following may be stated:

Dissolve 400 grams of urea $(CO(NH_2)_2)$ in 2000 cc. of 40% formaldehyde solution; heat the mixture on a steam bath until about 40 to 60% by weight of the mixture has been evolved; and then introduce into the remaining solution enough distilled water to restore its weight to about 75% of the weight of the original mixture. This leaves a moderately viscous liquid, or solution, of which approximately 60% is water containing considerable formaldehyde, the condensation product being held in solution. If desired, the liquor may be freed from the uncombined formaldehyde in any suitable manner, but it is preferred to allow some free formaldehyde to remain in the solution, where it apparently has a solvent action. The solution preferably is filtered to remove any insoluble present.

Having thus obtained a solution of urea condensation product, in which dimethylolurea

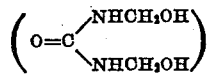

or a closely analogous compound, probably predominates, mix therewith a solution of salicylic acid in a solvent comprising ethyl alcohol, butyl alcohol and ethyl lactate, as follows:

| | |
|---|---|
| Urea condensation products solution | 81 cc. |
| Denatured alcohol | 50 cc. |
| Butyl alcohol | 42 cc. |
| Ethyl lactate | 7 cc. |
| Salicylic acid | 5 grams |

The alcohols and ethyl lactate serve to hold the salicylic acid in solution and facilitate its intimate mixture with or dispersion throughout the solution of the urea condensation product. It will be noted that the only water present, in accordance with this precedure, is the water of the condensation product solution, except that there may be a small percentage of water in the alcohol.

A lacquer produced in accordance with the method just described contains a high percentage of organic solvents. It is necessary that some water be present in the lacquer mixture, but the percentage may be varied within rather wide limits. However, it is desirable to lower rather than increase the percentage of water in the solvent, owing to the fact that the organic solvents mentioned possess a much lower surface tension than water and give to the lacquer a lower surface tension as a result. The low surface tension of the lacquer plays an important part in permitting the film to form properly on the metal surface. The ethyl lactate decidedly improves the spreading qualities of the lacquer; and, in the subsequent baking operation, tends to persist in the film during the hardening operation which converts the film to a highly resistant and insoluble condition. The low boiling alcohol and medium boiling alcohol, in addition to serving as solvents for the salicylic acid, give to the lacquer a desirable thinly viscous character, for dipping purposes. The solvents just mentioned may be largely evaporated in the air, or by heating at a temperature of about 100° C. for a short period; and the final hardening of the film may be accomplished by baking at a temperature of about 130° C.–135° C. for a suitable period, say about twenty minutes; or the hardening may be more rapidly effected by heating at a higher temperature, say a temperature of about 150° C. In some cases, five minutes baking will suffice.

The film may be applied to the metal surface by a dipping or other suitable process. After hardening the first film, the article may be dipped again and a second film applied in a similar manner, if desired, since the solvents of the lacquer will not dissolve the hardened film. This is a distinct advantage over cotton (pyroxylin) lacquers, for example.

It may be stated that a lacquer prepared in accordance with the process described above contains approximately 20% of solids, of which about one-eighth is salicylic acid. This, with the solvents employed, gives a suitable consistency to the lacquer where it is to be applied by a dipping process, and facilitates economical use of the lacquer. Upon distillation, 100 cc. of lacquer yielded 68 cc. of distillate containing about two-thirds of the original formaldehyde, amounting to about 9.5% of the lacquer.

It has been found that even a very thin film of the improved lacquer will successfully resist for prolonged periods the attacks of sulphur compounds, alcohol, air, moisture, salt-spray, etc., thus protecting the metal surface from tarnishing, or against corrosive action.

The improved lacquer possesses good keeping qualities, has a higher flash point than cotton lacquers, for example, yields a clear, hard, transparent film of high luster which is unusually resistant to tarnishing action in the air, highly resistant to solvents of the order of alcohol, acetone, etc., and highly resistant to sulphur and oxidizing agents, generally.

It has been found, for example, that a metal surface protected by the improved film will successfully resist for many hours the attack of fumes from a 1% solution of potassium sulphide liquid, when the coated article is located in a closed desiccator above such a solution; and, also, the film is similarly resistant to attack of alcohol vapors and liquid alcohol. Handling, perspiration, etc., will not injure the film.

When the lacquer film is subjected to a baking operation, as set forth above, the salicylic acid enters into the reaction which occurs in converting the film to the final hard and insoluble condition. It seems evident that the salicylic acid combines chemically with the condensation products of the urea employed, producing complex compounds. It has been found advisable, for some purposes, to employ the salicylic acid in substantially as large proportion as will pass into solution in the solvents employed. It has been found, for example, that five grams of salicylic acid in the lacquer mixture set forth above is much better than three grams or less. The salicylic acid does not act to expedite the reaction and is not a catalyzing agent in the ordinary sense. It is known that salicylic acid will combine with formaldehyde to form a resinous product, but apparently no such action occurs in hardening the present lacquer film. On the other hand, it is possible that the solvents employed may combine with such free formaldehyde as may be present in the mixture and be evolved with the solvents in the drying and baking operations. It is possible, also, that some of the free formaldehyde may combine with both the salicylic acid and urea condensation products by a complex reaction, in the baking of the film, but experience indicates that the free formaldehyde is practically eliminated from the lacquer in converting to the final insoluble state.

The insoluble film produced in the manner described is vastly more resistant to the action of sulphur, alcohol, etc., than is a film produced from the urea condensation products alone. It has been found, for example, that a film from a lacquer of urea condensation products, without the use of a chemical-resistivity increasing agent, will be attacked within a very small fraction of the time which would be required in the case of the improved lacquer described herein, when subjected to the sulphur test described above.

The lacquer, after application to the surface to be protected, may be air dried at room temperature, if desired. In any case, it is desirable to carry the drying to a point where the film is dry to the touch and the work may be handled, before subjecting the film to the final baking operation, which desirably is done at a temperature considerably above 100° C. The drying and baking may be done by subjecting to gradually increasing temperature, if desired. Regardless of the exact nature of the chemical reactions which take place, a very dense clear and hard film is produced which adheres with great tenacity to the metal and which is continuous, or unbroken, being free from cracks, voids, etc., which, if present, might leave the metal open to attack at points. It is believed that the greatly increased chemical resistivity is due mainly to the formation of complex reaction compounds between the condensation products of urea and salicylic acid. It is possible that the effect is enhanced by the formation of different resinous products, which are, however, so thoroughly diffused, or blended, as to produce a practically homogeneous body in the final product. In any event, the film is dense, hard, and apparently wholly free from voids.

While it is preferred to form the urea condensation product by heating in the manner set forth above, it is to be remarked that the ureas and aliphatic aldehydes, such as formaldehyde, will combine to form condensation products at room temperatures. To effect the condensation in this manner, however, requires a period of many hours, so that it seems preferable to effect the condensation in the manner first stated; and this has the added advantage where a formaldehyde solution is employed, of enabling a proportion of the water to be evaporated, so that the lacquer may ultimately be a solution comprising a rather high percentage of organic solvents having low surface tensions.

Also, it is to be remarked that the urea condensation products may be produced in the presence of acid, in the presence of alkali, or in a practically neutral menstruum. For illustration, the formaldehyde solution may contain about .2% formic acid, or may be neutralized with potash, or made .2% alkaline, calculated as KOH. Larger proportions of acids, or alkalies, may be employed, however, but it is not desirable to use more than minute percentages of strong alkalies, or acids.

While one may dissolve the salicylic acid in organic solvents, before effecting mixture with the solution of urea condensation products, it is possible to first mix the organic solvents with the solution of urea condensation products and then mix therein the salicylic acid which goes into solution in the mixture.

When the urea condensation product solution is produced in the manner above stated, the solution ordinarily is practically water white and moderately viscous; and after a lacquer has been produced in the manner stated, the lacquer also is water white. It may happen, however, that in producing the solution of condensation products, insoluble or floating substances may form, giving the liquid a clouded appearance. Where such solution is not clear and of water-like whiteness, it may be made clear by filtering the liquor and thus removing bodies which give the clouded appearance. In some cases, iron is present as an impurity in the floating substances and ordinarily will be removed therewith in the filtering operation. If the iron be not removed before mixing with salicylic acid, the lacquer may acquire a slight reddish tint.

The proportions of materials employed in forming the soluble condensation products of urea may vary within rather wide limits; also the proportions of materials which form the lacquer may vary within rather wide limits. In forming the urea condensation product, it is not desirable to use much less than five parts of the formaldehyde solution to one part of the urea. Apparently, however, the proportion of formaldehyde may be increased considerably without great detriment to the process. Any large increase in the formaldehyde results, however, in the introduction of additional water into the solution of the condensation product; and, as indicated, this is undesirable, as it may render necessary excess evaporation.

Various combinations of solvents may be employed in the lacquer. For example, one may employ water (present in the urea condensation products solution) and any suitable organic solvent, or mixture of organic solvents, such as normal propyl alcohol, isopropyl alcohol, acetone, ethylene glycol monoethyl ether, isobutyl alcohol, benzene, butyl acetate, etc. Denatured alcohol may form a part of a suitable combination of solvents, where the denaturant is such as not to adversely influence the result. The denaturants approved by the Government for nitrocellulose lacquers do not seem to adversely influence the result. Some denaturants, such as zinc chloride, sulphuric acid, etc. adversely affect the product.

The following table gives the boiling points and approximate surface tensions, in dynes per centimeter, of the solution of urea condensation product given in the first example above, the organic solvents of the lacquer in the example given, water, and the lacquer produced in accordance with the first example given:

| Substance | Boiling point | Temperature approximately 72° F. Surface tension in dynes per centimeter |
|---|---|---|
| Urea condensation products solution | 100° C. | 59.4 |
| Denatured alcohol (ethyl) | 78° C. | 21.7 |
| N-butyl alcohol | 118° C. | 22.4 |
| Ethyl lactate | 154° C. | 27.8 |
| Water | 100° C. | 72.2 |
| Lacquer | | 27.4 |

In the table it will be noted that water has the highest surface tension and the alcohols the lowest. In order to have proper spreading of the lacquer and decrease the tendency of the film to coalesce on drying, it is necessary for the solution to have a low surface tension. The surface tensions of denatured alcohol, butyl alcohol and ethyl lactate are all comparately low while their boiling points are respectively 78° C., 118° C., and 154° C. so that at all stages of the drying process there is present some low surface tension material. Denatured alcohol may be turned a "low boiler", butyl alcohol, a "medium boiler" and ethyl lactate, a "high boiler". In addition to the very desirable surface tension characteristics of denatured alcohol, butyl alcohol and ethyl lactate, their presence is necessary to dissolve the salicylic acid which is practically insoluble in water.

Another example of lacquer produced in the manner first described in this specification, but employing substitute organic solvents is as follows:

Solution of urea condensation
  products _____ 81 cc.
Isopropyl alsohol _____ 33 cc.
Normal propyl alcohol_____ 33 cc.
Ethylene glycol monoethyl ether_ 33 cc.
Salicylic acid _____ 5 grams.

The lacquer just specified gives fairly satisfactory results. The boiling points and surface tensions of the organic solvents are stated in the following table:

| Substance | Boiling point | Surface tension in dynes per cm. at approximately 72° F. |
|---|---|---|
| Isopropyl alcohol | 82° C. | 21.0 |
| Normal propyl alcohol | 97° C. | 23.0 |
| Ethylene glycol monoethyl ether | 135° C. | 25.5 |

Experience indicates that it is desirable to have present organic solvents that have varying boiling points and low surface tensions (closer to the surface tension of ethyl alcohol than to that of water).

The salicylic acid referred to above is the common or commercial material, that is, ortho hydroxy benzoic acid. The meta and the para hydroxy benzoic acids may be employed with good results, but the ortho is cheaper and readily available. However, when meta or para is employed, the reddish color will not result when iron impurities are present in the urea condensation product.

Various substitutes for the salicylic acid may be employed, but the best results are obtained from salicylic acid. All of the compounds which experimentation has shown to be serviceable with more or less satisfactory results as chemical-resistivity increasing agents may be classed as organic acids or their derivatives which do not act merely as catalyzers, but which are combined in considerable proportions, as chemical-resistivity increasing agents, in the novel compound.

Substances which may serve as substitutes for the salicylic acids in the present invention are aromatic compounds, in which the compound has: (1) both a hydroxyl group and a carboxylic group; (2) derivatives therefrom, in which: (a) ammonium, magnesium or strontium has been substituted for the hydrogen of the carboxylic group or (b) an acetyl radical has been substituted for the hydrogen of the hydroxyl group to form acetyl salicylic acid. The following are examples of suitable compounds, and recognized equivalents are not to be excluded from the scope of the appended claims: salicylic acids, ammonium salicylate, acetyl salicylic acid, hydroxy-naphthoic acids, gallic acid, strontium salicylate, salicylamide, and magnesium salicylate. Of this list, the hydroxy benzoic acids are preferred, and the last three mentioned substances have proven only moderately good, the least desirable results having been obtained from the use of magnesium salicylate.

Of the salicylic acids, the ortho is preferred largely because it is more readily and cheaply obtainable. Acetyl salicylic acid and hydroxy-naphthoic acids give excellent results, but are more expensive than ortho salicylic acid.

Of the ingredients of a solvent comprising a plurality of organic solvents, it appears that ethyl lactate possesses a high boiling point and low surface tension; also that ethylene glycol monoethyl ether corresponds rather closely in these characteristics with ethyl lactate. Such solvents tend to persist in the film and to maintain its continuity until the hardening operation nears the final point. Any other suitable substance may be used as a substitute. It may be mentioned that both of the solvents here mentioned are alcohol-soluble and water-soluble.

As has been indicated, the proportions in which the materials may be employed may be varied. The ratio of salicylic acid to urea preferably is from 15% to 200% of the urea employed in producing the condensation product. In the illustration given in the first example the salicylic acid is perhaps 30% of the urea entering into the condensation product, and this is a preferred minimum, whilst at 15% ratio may be taken as a minimum below which one cannot go without reducing the efficacy of the ingredient to a point where its use would give slight benefit.

In case of the use of derivatives of urea, or thiourea, or other substitutes, the proper proportion of chemical-resistivity increasing agent to be combined therewith can be determined by the chemist; and where a substitute for salicylic acid is employed, the proportions will be varied to suit the case and in accordance with the results desired.

As has been indicated, it seems probable that the solvents do not enter into chemical combination with the solids, but are evaporated in the drying and baking operations.

The nature of the solvents and the combinations of solvents do affect the character of the film because of their properties to maintain uniform colloidal solutions of the solids during the drying process. This is a physical chemistry relation, and the miscibility and solubility of the solvents with respect to each other, and the surface tensions and boiling points are important factors connected with the deposition of the film. If more than 50% of water is present in the solvent as a whole, assuming the lacquer to contain about 20% of solids, there will be a tendency towards colloidal separation in the lacquer and the formation of two layers. Preferably, the water is about 25%, or less, but it is desirable to employ not substantially less than 15% water. It is not desired to limit the invention unduly, however, as less water may be desirable for some purposes.

Various ingredients may be introduced into the novel composition of matter described. For example, castor oil in small percentage may be incorporated in the lacquer, and will serve as a plasticizer, tending to make the film more pliable and tenacious aiding in insuring the continuity of the film, and tending to render the film more impervious to liquids.

As an example of a lacquer containing castor oil and giving good results, the following is given:

| | |
|---|---|
| Solution of urea condensation products (first described) | 81 cc. |
| Denatured alcohol | 50 cc. |
| Butyl alcohol | 41 cc. |
| Ethyl lactate | 7 cc. |
| Castor oil | 1 cc. |
| Salicylic acid | 3.5 grams |

In this lacquer, the castor oil is present in proportion equal to about 2½% of the solids. This represents about as much castor oil as will go into solution.

Other ingredients acting more or less as plasticizers may be substituted for castor oil, as, for example, oleic acid, mastic, natural resins, etc.

Tri cresyl phosphate, di butyl phthalate, and butyl stearate have not proven particularly beneficial in the lacquer. On the other hand, the use of natural gums, such as mastic, in moderate proportions, is decidedly beneficial.

In the examples given above, the use of 1 gram of urea to 5 cc. of 40% formaldehyde solution is equivalent, in molecular proportions, to about 1 to 4.

The improved compound may be employed as a plastic by a suitable procedure. For example, the lacquer may be mixed with suitable fillers, such as wood pulp, asbestos, cotton, etc., pigments being added if desired; and the material thus prepared may be molded in a heated press. If desired, the solvents may be largely evaporated, preferably at comparatively low temperatures, in vacuo, if preferred, before the mass is subjected to the molding operation.

Another method is to first separate the solvents from the soluble urea-formaldehyde condensation products by any known or suitable method; mix with the dried products the proper proportion of salicylic acid, or its equivalent; and mix with suitable fillers and pigments, if desired, and mold in a heated press. Preferably the molding will be accomplished at a temperature of 135° C., or higher, and under heavy pressure, such as a pressure of two thousand pounds per square inch. The molding operation continues until the product is hard, substantially insoluble, and highly inert. If desired, the mold may be cooled before removing the product.

While the molecular proportions employed in forming the soluble urea-formaldehyde condensation product are preferably 1 to 4, tests indicate that these compounds are finally present in the resultant product in the proportions of about 1 to 2; and, as indicated above, when the combination with the salicylic acid is effected, doubtless complex compounds are formed between the salicylic acid and the urea-formaldehyde condensation products.

In making a transparent plastic, the soluble urea-formaldehyde condensation product mentioned above may have the solvents removed therefrom, as by evaporating in vacuo; the dried solid will be ground and may then be mixed mechanically with dry salicylic acid. These products may then be combined by heat and pressure. The product may be rolled into plates, sheets, or panes, by means of heated rollers, if desired. This should give a clear transparent block, or sheet, capable of permitting the transmission of violet and ultra violet rays, suitable for use in solariums, or in rooms designed to give the benefit of such rays.

If desired, other suitable materials may be incorporated in the plastic.

The improved compound may be employed for impregnating sheets of fibrous materials, cloths, paper fabrics, etc.; and the impregnated sheets may be consolidated, if desired, into a laminated product. This result may be accomplished in any desired way. For example, one may impregnate cloth fabrics, paper fabrics, or the like, with the lacquer, then dry the sheets, and then consolidate them in a highly heated press under heavy pressure.

In those situations where the highest resistance to solvents is not a primary consideration, additional urea may be incorporated in the lacquer, or in the compound containing salicylic acid; and the resultant mixture may be formed into a plastic, or employed as a lacquer, if desired.

It is possible to employ the salicylic acid in much higher proportions than stated in the examples given above. The resistance of the lacquer, for example, to sulphur fumes seems to increase with the percentage of salicylic acid, although not in the same ratio. As an example of a lacquer possessing a larger proportion of salicylic acid than has been given above, and possessing greater resistance to solvents, the following is given:

| | |
|---|---|
| Soluble urea-formaldehyde condensation products (as given above) | 81 cc. |
| Denatured alcohol | 50 cc. |
| Butyl alcohol | 42 cc. |
| Ethyl lactate | 7 cc. |
| Salicylic acid | 20 grams |

The alcoholic-like solvents and diluents suitable for employment in the lacquer may include ethers, alcohols, ketones, esters; also, the solvents may include petroleum and coal tar hydrocarbons, terpenes, hydrocarbon chlorides, and suitable physical or chemical mixtures, of such solvents.

Various materials and compounds may, for the purpose of modifying the results, be incorporated with the urea-formaldehyde-salicylic acid compound. For example, a mixture of the urea-formaldehyde-salicylic acid compound and a potentially reactive phenolic condensation product may be made; and the resultant compound may be hardened under heat and pressure.

It has been determined that the film produced from the lacquer first described will char at about 200° C.; and in hardening the film from such a lacquer a minimum temperature of about 120° is desirable.

The solid material (plastic, or block) produced as described above may be sawed, turned, or bored, when properly formed for such purposes.

It has been found that the improved lacquer described above may be blended advantageously, for some purposes, with other lacquers, or other materials. For example, the lacquer described above may be compounded with a cellulose lacquer successfully in varying ratios. As an example, 60% of a suitable cotton lacquer and 40% of the novel lacquer described above may be blended. On the other hand, blended lacquer may be produced containing as little as 8% of the cotton lacquer. The blending can best be effected by mixing together a completely formulated cotton lacquer with a completely formulated lacquer comprising urea-formaldehyde-salicylic acid.

The following may be given as a typical mixed lacquer, namely, 1 part of the improved lacquer described above and 2 parts of a cellulose lacquer, such as the following:

*Cellulose lacquer*

| | Gallons |
|---|---|
| 10 oz. cotton in butyl acetate | 13 |
| 30 oz. cotton in butyl acetate | 1½ |
| Butyl acetate | 7½ |
| Butyl alcohol | 7 |
| Denatured alcohol | 6½ |
| Benzol | 9 |
| Shellac solution (5lb. per gal. alcohol) | 3½ |
| Mastic (3 lbs. mastic in 1 gal. equal parts butyl acetate and denatured alcohol) | 2 |

The blended lacquer just described, of which the cotton lacquer forms a part, may be satisfactorily applied by spraying, or by dipping. It will harden to the touch at room temperature in about twenty minutes, but in order that it may resist sulphur and alcohol fumes, the lacquered work should be baked at a suitable temperature, such as 135° C., for about twenty minutes.

The solids in the blended lacquer which has just been described are:

| | |
|---|---|
| Cotton | 2.3 oz./gal. |
| Shellac | 2.4 oz./gal. |
| Mastic | 0.9 oz./gal. |
| Urea-formaldehyde-salicylic acid resin | 9.7 oz./gal. |

The gums, shellac and mastic, are desirable, but they are not absolutely necessary.

It has been found that the urea-formaldehyde-salicylic acid first described above may be blended with lacquer enamels which are on the market in this country. In effecting such blending, it is advisable sometimes to prepare initially a special blending lacquer, such as the following:

*Blending lacquer No. 1*

| | Gals. |
|---|---|
| Lacquer first described above | 30 |
| Ethyl lactate | 10 |
| 10 oz. cotton in ethylene glycol monoethyl ether | 10 |

*Blending lacquer No. 2*

| | Gals. |
|---|---|
| Lacquer first described above | 25 |
| Ethyl lactate | 10 |
| Denatured alcohol | 5 |
| 10 oz. cotton in butyl acetate | 10 |

In blending with the cotton lacquers on the market mentioned above (Du Pont Company, C. Zapon Company, Essex Varnish Company, Van Schaack Chemical Bros.) mix from 1 to 2 parts of the blending lacquer with 1 part of the lacquer enamel. The lacquer enamels on the market which have been referred to contain usually about 2 parts of cotton to 1 part of a natural gum, and some solid pigments, and, if desired, a dye, or coloring matter. The cotton gives to the solution a high viscosity which prevents the pigments from settling out. The solvents used in compounding the lacquer enamels are similar to those mentioned above as alcohol-like solvents, but, in general, having the higher boiling points to cause slower drying. These lacquers also contain plasticizers, such as butyl stearate, butyl tartrate, castor oil, China-wood oil, dibutyl phthalate, tricresyl phosphate, and triphenyl phosphate. The combination, or mixture, of cotton-gum lacquer enamel and a blending-lacquer, as described, gives a film of greater luster, greater hardness, greater adhesion to metal and greater resistance to alcohol and water than the usual lacquer enamels. Baking at high temperature apparently frees the film from odor, also. Such mixtures may also be used in forming plastics.

The special blending lacquer described above contains some cotton and solvents, in addition to the urea-formaldehyde-salicylic acid lacquer. Should the latter be added alone to the lacquer enamel, it may cause some of the pigments to coagulate.

It has been found that natural gums can be blended with the urea-formaldehyde-salicylic acid lacquers. The gums are first dissolved in a solvent. The solvent may vary for the different gums. Denatured alcohol is suitable for shellac, and a mixture of denatured alcohol and butyl acetate is suitable for mastic. Mastic is quite a plastic gum and serves to make the lacquer first described above more plastic. Suitable proportions are 4 parts of the lacquer first described above and mastic solution 1 part. The mastic solution contains 35 ounces of mastic to 1 gallon of solution.

Among the natural gums which may be employed may be mentioned the following: Kauri, copal, sandarac, guaiac, dammar, camphor, zanzibar, elemi, rosin and ester gum.

Instead of the ureas, other active resin-forming carbon-amino compounds may be employed. These substances may be defined as substances in which a plurality of nitrogen atoms are connected to a carbon atom, at least one of the nitrogen atoms being amino-nitrogen. Apparently, the oxygen and sulphur atoms which are typical of urea and thiourea are not essential to the reaction.

Suitable pigments, organic coloring materials, etc., may be introduced, for example, into the clear lacquer first described, so that the film produced therefrom may have any desired color. If desired, materials for thickening the lacquer and for aiding in keeping pigments in colloidal suspension may be introduced. Also, if desired, finely ground materials for giving body and/or cheapening the cost may be incorporated in the lacquer. Similarly, such substances may be introduced into the plastic, or into the molding compound. The latter may be produced in comminuted form for convenience in filling the molds. Waxes, in small proportions, may be incorporated in these novel compounds, and may be especially advantageous in the molding compounds, tending to facilitate removal from the mold and to give a fine finish.

By preparatorily producing a condensation product of an aliphatic aldehyde and a urea, or equivalent material, and then mixing therewith salicylic acid, or an equivalent material, a composition of matter is provided which can be converted into the final infusible substantially insoluble condition, and the procedure noted enables the reactions to be easily controlled. For example, in preparing the aldehyde-urea condensation product, employing a large excess of formaldehyde solution in the preparation, it is possible to prolong the cooking operation many hours without injury to the product.

Moreover, the solution of the condensation product just mentioned may be kept indefinitely without danger of solidification and may be used as a source of supply for preparing improved lacquer; and the improved lacquer is then readily prepared by mixing with the solution of said condensation product an organic solvent comprising a plurality of low surface tension organic solvents having substantially different boiling points, and salicylic acid, or the like. In this mixing operation the formaldehyde solution and the organic solvents cooperate in dissolving and holding in solution the salicylic acid; and the improved lacquer thus produced may be kept indefinitely without danger of solidification and finally may be applied to the surface of an article, dried and hardened, thus producing a final infusible and substantially insoluble film of the improved character noted above.

The procedure here referred to possesses important advantages over the procedure of initially mixing, for example, urea, formaldehyde, and salicylic acid, and then heating the mixture to cause reaction. In such procedure, it is impossible to control the reaction in such manner as to obtain the best technical results, and there are numerous objections which apply to such procedure and do not apply to the procedure whereby the condensation product of urea and formaldehyde is preparatorily formed and afterwards mixed with salicylic acid, for example, before subjecting to heat treatment to produce a final infusible and substantially insoluble product.

The expression "a urea-aldehyde condensation product" used in the appended claims should be understood as a descriptive expression, and not intended to unduly limit the invention. Thus, where the prior art permits, the use of the expression noted is not to be understood as excluding equivalent condensation products, but rather to include condensation products formed by combining aliphatic aldehydes and the ureas, or equivalent substances, set forth at the beginning of the specification.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The process of producing a composition which is convertible by heat to substantially insoluble condition, which comprises mixing: a urea-aldehyde condensation product; and a compound adapted to combine therewith under the action of heat to form a substantially insoluble product, said compound being selected from a group consisting of the following compounds, namely, salicylic acids, ammonium salicylate, acetyl salicylic acid, hydroxy-naphthoic acids, gallic acid, strontium salicylate, salicylamide, and magnesium salicylate.

2. The process of producing a composition which is convertible by heat to substantially insoluble condition, which comprises mixing: an aqueous aliphatic aldehyde solution of a urea-aldehyde condensation product; and a compound adapted to combine with said condensation product under the action of heat, said compound being selected from a group consisting of the following compounds, namely, salicylic acids, ammonium salicylate, acetyl salicylic acid, hydroxy-naphthoic acids, gallic acid, strontium salicylate, salicylamide, and magnesium salicylate.

3. The process as stated in claim 2, as practiced by employing the compound selected from said group in amount equal to at least 15% of urea employed in producing said condensation product.

4. The process of producing a composition which is convertible by heat to substantially insoluble condition which comprises mixing: an aqueous aliphatic aldehyde solution of a urea-aldehyde condensation product; a solvent comprising a mixture of low surface-tension organic solvents having substantially different boiling points; and a compound adapted to combine under the action of heat with said condensation product to form a final substantially insoluble product, said compound being selected from a group consisting of the following compounds, namely, salicylic acids, ammonium salicylate, acetyl salicylic acid, hydroxy-naphthoic acids, gallic acid, strontium salicylate, salicylamide and magnesium salicylate.

5. Preparatorily producing an aqueous formaldehyde solution of a condensation product of urea and formaldehyde; and mixing therewith a solvent comprising a plurality of low surface-tension organic solvents having substantially different boiling points, said solvent being taken in greater proportion than the water and formaldehyde present in the solution, and a compound adapted to combine with said condensation product under the action of heat to produce a substantially insoluble product, said compound being selected from a group consisting of the following compounds, namely, salicylic acids, ammonium salicylate, acetyl salicylic acid, hydroxy-naphthoic acids, gallic acid, strontium salicylate, salicylamide and magnesium salicylate.

6. The process of producing a compound which is convertible by heat to substantially insoluble condition, which comprises mixing: a urea-aldehyde condensation product; a solvent comprising a plurality of low surface-tension organic solvents having substantially different boiling points; a plasticizing agent; and a compound adapted to combine with said condensation product under the action of heat to form a substantially insoluble product, said compound being selected from a group consisting of the following compounds, namely, salicylic acids, ammonium salicylate, acetyl salicylic acid, hydroxy-naphthoic acids, gallic acid, strontium salicylate, salicylamide, and magnesium salicylate.

7. The process set forth in claim 6, in which the compound selected from said group is one having both a hydroxyl group and a carboxylic group.

8. The process set forth in claim 1, in which the compound selected from said group is one having both a hydroxyl group and a carboxylic group.

9. The process set forth in claim 5, in which the compound selected from said group is one having both a hydroxyl group and a carboxylic group.

10. The process stated in claim 4, in which the solvents employed include water, formaldehyde, ethyl alcohol, butyl alcohol and ethyl lactate.

11. The process of producing a composition which is convertible by heat to substantially insoluble condition which comprises: preparatorily producing in solution in formaldehyde and water a urea formaldehyde condensation product using a large excess of formaldehyde in effecting the reaction; evaporating a portion of the solvent; and mixing with the concentrated solution a compound adapted to combine with said condensation product to form a substantially insoluble product, said compound being selected from a group consisting of the following compounds, namely, salicylic acids, ammonium salicylate, acetyl salicylic acid, hydroxy-naphthoic acids, gallic acid, strontium salicylate, salicylamide, and magnesium salicylate.

12. The process set forth in claim 11, characterized by adding to the solution after the evaporating operation, an organic solvent of high boiling point.

13. The process stated in claim 11, combined with the step of introducing pigments into the concentrated solution.

14. A lacquer adapted to serve as a substitute for vitreous enamel, comprising a mixture of a concentrated solution of a urea-aldehyde condensation product, a plurality of low surface-tension organic solvents having substantially different boiling points, and a compound adapted to combine under the action of heat with said condensation product, said compound selected from a group consisting of the following class of compounds, namely, salicylic acids, ammonium salicylate, acetyl salicylic acid, hydroxy-naphthoic acids, gallic acid, strontium salicylate, salicylamide, and magnesium salicylate.

15. A lacquer as specified in claim 14 in which the selected compound is a salicylic acid.

16. A composition of matter adapted to be converted by heat to substantially insoluble condition, said composition comprising a mixture of: a urea-aldehyde condensation product; and a compound adapted to combine chemically therewith under the action of heat to form a substantially insoluble product, said compound being selected from a group consisting of the following compounds, namely, salicylic acids, ammonium salicylate, acetyl salicylic acid, hydroxy-naphthoic acids, gallic acid, strontium salicylate, salicylamide, and magnesium salicylate.

17. A composition of matter as set forth in claim 16, in which the selected compound is one having both a hydroxyl group and a carboxylic group.

18. A composition of matter adapted to be converted by heat to substantially insoluble condition, said composition comprising a mixture of: an aqueous solution of a urea-aldehyde condensation product; a solvent comprising a plurality of low surface-tension organic solvents having substantially different boiling points; and a compound adapted to combine chemically with said condensation product to form a substantially insoluble final product, said compound being selected from a group consisting of the following compounds, namely, salicylic acids, ammonium salicylate, acetyl salicylic acid, hydroxy-naphthoic acids, gallic acid, strontium salicylate, salicylamide, and magnesium salicylate.

19. A composition of matter as set forth in claim 18, in which the compound selected from said group is one having both a hydroxyl group and a carboxylic group.

20. A composition of matter adapted to be converted by heat to substantially insoluble condition, comprising: a urea-aldehyde condensation product; a plurality of solvents comprising water, an aliphatic aldehyde, and a plurality of low surface-tension organic solvents having substantially different boiling points; and a compound adapted to combine with said condensation product under the action of heat to form a substantially insoluble product, said compound being selected from a group consisting of the folowing compounds, namely, salicylic acids, ammonium salicylate, acetyl salicylic acid, hydroxynaphthoic acids, gallic acid, strontium salicylate, salicylamide, and magnesium salicylate.

21. The composition of matter as set forth in claim 20 in which the compound selected from said class is ortho-salicylic acid.

22. The composition of matter as stated in claim 20, in which one of the organic solvents has a boiling point above 120° C.

23. A lacquer comprising a mixture of: a urea-aldehyde condensation product; salicylic acid; and a solvent comprising ethyl lactate and a plurality of alcohols having substantially different boiling points.

ROBERT W. BELFIT.